United States Patent [19]
Jacob

[11] Patent Number: 6,149,524
[45] Date of Patent: Nov. 21, 2000

[54] CONSTANT VELOCITY JOINT

[75] Inventor: Werner Jacob, Frankfurt, Germany

[73] Assignee: GKN Lobro GmbH, Germany

[21] Appl. No.: 09/234,529

[22] Filed: Jan. 21, 1999

[30] Foreign Application Priority Data

Jan. 23, 1998 [DE] Germany .......................... 198 02 587

[51] Int. Cl.[7] ........................................................ F16D 3/16
[52] U.S. Cl. .............................. 464/15; 464/906; 464/145
[58] Field of Search .................................... 464/15, 7, 139,
464/141, 140, 145, 142, 906

[56] References Cited

U.S. PATENT DOCUMENTS

| | | | |
|---|---|---|---|
| 2,015,390 | 9/1935 | Williams | 464/139 |
| 3,362,192 | 1/1968 | Orain | 464/141 |
| 4,319,465 | 3/1982 | Ito et al. | 464/141 |
| 5,954,587 | 9/1999 | Jacob et al. | 464/145 |

*Primary Examiner*—Anthony Knight
*Assistant Examiner*—Kenneth Thompson

[57] ABSTRACT

In a constant velocity joint, the inner running grooves start from a first end of the inner part and extend along the entire length of the inner part as far as a second end. The inner running grooves are open toward the second end, and toward a central recess which starts from the second end. The central recess provides a lubricant groove function. Further, the inner running grooves preferably have a first portion and a second portion. The first portion serves to receive an associated ball extending through a cage and into the outer part. The second portion also provides a lubricating function.

6 Claims, 2 Drawing Sheets

CONSTANT VELOCITY JOINT

BACKGROUND OF THE INVENTION

The invention relates to a constant velocity joint having an outer part with a cavity whose inner face is provided with outer running grooves arranged in meridian planes relative to the longitudinal outer part axis. An inner part is arranged in the cavity of the outer part and which, in an outer face, comprises inner running grooves which, in accordance with the outer running grooves, are circumferentially distributed in meridian planes around the longitudinal inner part axis. One portion of the outer face is provided in the form of a spherical bearing face. A hollow cage comprises a hollow spherical partial face for being slidingly supported on the spherical bearing face of the inner part. The cage comprises radially open windows. Balls are received in the windows of the cage and project outwardly into an outer running groove and inwardly into an inner running groove.

With such a constant velocity joint as described in U.S. Pat. No. 5,376,092, the inner running grooves start from one end of the inner part and extend with a decreasing cross-section towards the other end and are covered by the cage. Furthermore, they are machined along their entire length or produced to their end dimensions by a non-chip-forming operation. The cage, by means of its hollow spherical partial face, slides on a spherical bearing face of the inner part.

It is the object of the invention to improve a constant velocity joint of this type in respect of the sliding conditions between the cage and the inner part to ensure that even in those cases where impact loads occur, there are achieved lubrication conditions which are at least similar to a hydro-dynamic friction.

SUMMARY OF THE INVENTION

In accordance with the invention, one objective is that the inner running grooves start from a first end of the inner part, extend along the entire length of the inner part as far as a second end. The inner running grooves are open towards the second end and towards a central recess which starts from the second end.

The advantage of this embodiment is that there is made available a relatively large lubricant reservoir in the region which is subject to a sliding friction. During the movement of the cage and inner part, when the joint parts are articulated and rotate relative to one another, the surfaces contacting one another are each provided with a sufficient amount of lubricant. The grease which, during rotation, is under the influence of a centrifugal force is guided into said region of the hollow spherical partial face of the cage.

According to a further embodiment of the invention the inner running grooves, starting from the first end, serve only along a first portion as running grooves for the associated ball. A second portion extending towards the second end has a modified cross-section relative to the first portion and/or a surface condition deviating therefrom.

The second portions of the inner running grooves are used as a lubricant reservoir and open towards the hollow spherical partial face in order to allow the lubricant to come into contact with the latter. As the balls do not come into contact with the second portions of the inner running grooves, the latter are not machined to their end dimensions. This means that only the first portions of the inner running grooves are produced to their end dimension by means of a non-chip-forming operation, for instance stamping. In consequence, only a small surface percentage has to be subjected to the stamping operation, so that only low deformation forces are required. To further assist the functional separation between said two portions, there exists a circumferentially extending groove therebetween. The material displaced while the first portion is stamped can escape into the groove. For this reason, the first portion may also have a small groove extending along the base of that groove.

To be able to connect the inner part to a shaft, the former is provided with a through-bore with teeth. The through-bore is centered on the longitudinal axis of the inner part. The diameter of the recess is greater than the diameter of the through-bore. If the inner part is integral with a shaft, the latter is provided with a circumferentially extending indentation corresponding to the recess.

To improve the friction conditions further and to come as close as possible to hydro-dynamic lubrication conditions, it is proposed according to a further embodiment that in the bearing face of the inner part, there is provided at least one lubricating groove. The lubricating groove is arranged in the form of an annular portion around the longitudinal inner part axis in the outer face of the webs remaining between two adjoining inner running grooves. The lubricating groove is laterally open towards the adjoining inner running grooves and open towards the hollow spherical partial face of the cage.

To ensure that the lubricant is held in the region extending towards the hollow spherical partial face, there is provided a cap. The cap is arranged in the region of the second end and partially extends over the cage on its outside. The cap comprises a wall is positioned inside the recess and which is arranged at a distance from the outer boundary of the recess.

BRIEF DESCRIPTION OF THE DRAWINGS

A preferred embodiment of the invention is diagrammatically illustrated in the drawing wherein.

DETAILED DESCRIPTION

Figure 1:
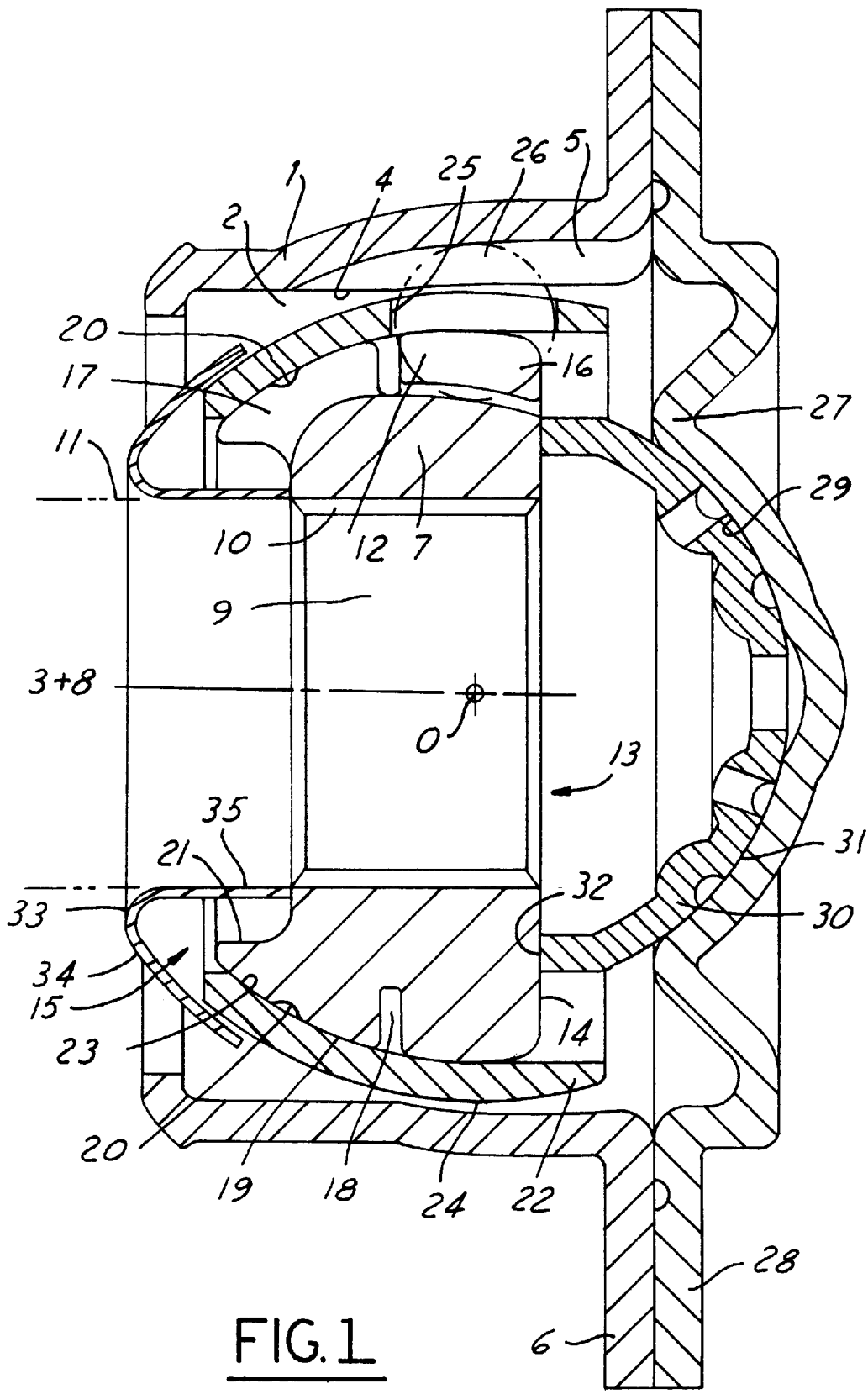
FIG. 1 shows a longitudinal section of an inventive constant velocity joint in the articulated condition.
Figure 2:
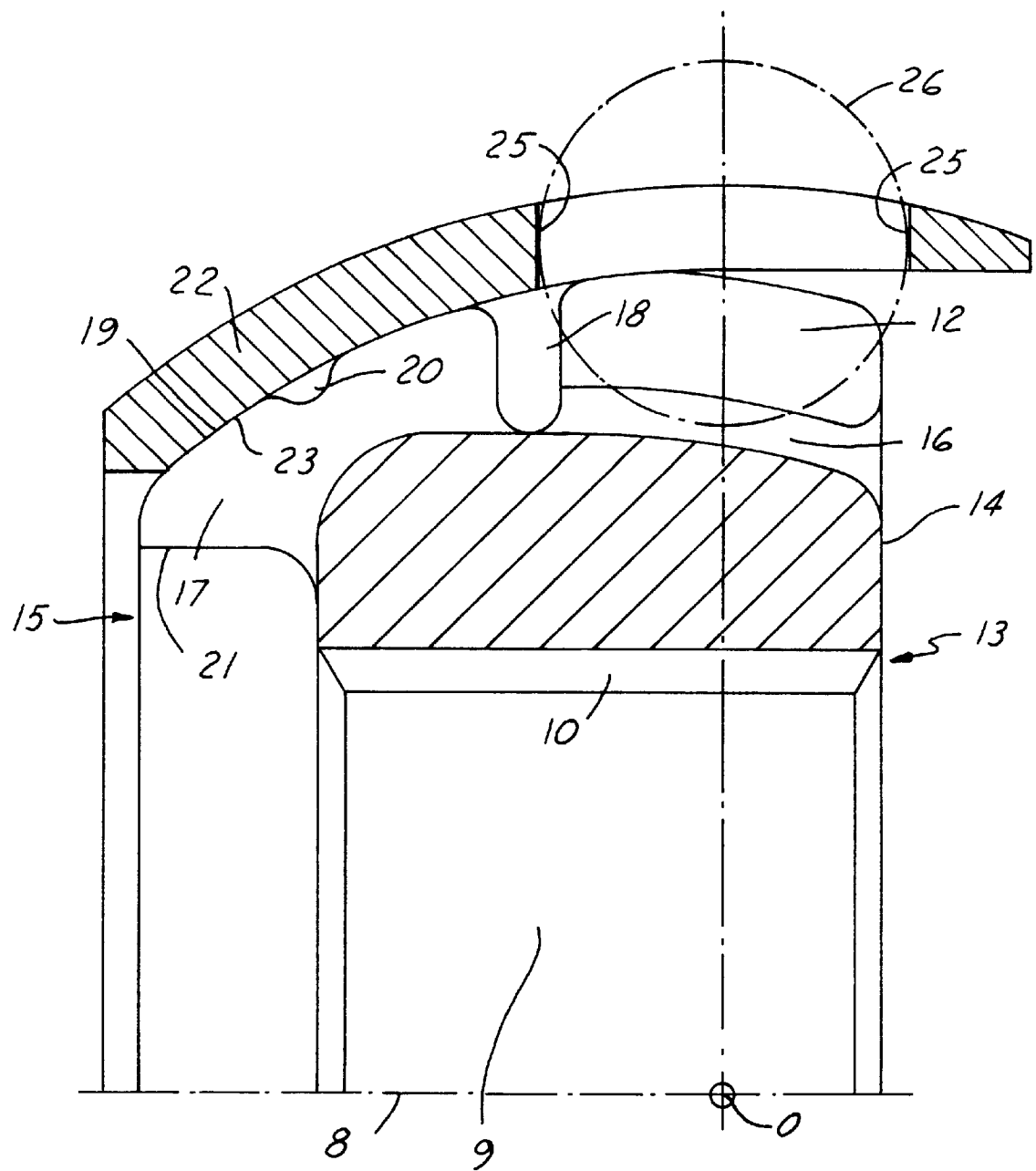
FIG. 2 shows a detail of FIG. 1 in the form of half a section through an inner part and a cage only, in an enlarged scale relative to FIG. 1.

In the following description, reference is made to both Figures simultaneously. The outer part 1 is provided in the form of a plate metal part and comprises a cavity 2. Outer running grooves 5 are open towards the inner face 4. The grooves 5 start from a first opening end of the outer part 1 and extend in meridian planes which are circumferentially distributed around the longitudinal outer part axis 3. The outer part 1 comprises a flange 6. An inner part 7 is received in the cavity 2 of the outer part 1. The inner part 7 has a longitudinal inner part axis 8. Axes 3 and 8 correspond to one another because the inner part 7 and the outer part 1 are in the aligned condition. The inner part 7 is provided with a through bore 9 comprising teeth 10 for connecting a shaft 11 partially shown in dashed lines. In its outer face, the inner part 7 is provided with inner running grooves 12 which are circumferentially distributed in accordance with the outer running grooves 5 in the outer part 1 and which extend in meridian planes around the longitudinal inner part axis 8. The inner running grooves 12 start from a first end 13 which comprises the end face 14 and on which the longitudinal inner part axis 8 is positioned perpendicularly. The inner running grooves 12 comprise a first portion 16 which starts from the first end 13 and is separated by a groove 18 from a second portion 17 following in the direction towards the second end 15. A small groove 9 is provided extending along the brake of the first portion 16 of the inner running grooves 12. In the region of the second end 15, there is provided a recess 21 which is centered on the longitudinal inner part axis 8 and whose diameter is greater than that of the through-bore 9. The second portion 17 of the inner running grooves 12 is open towards the second end 15 and towards the recess 21. Towards the second end 15, the inner part 7, on its outside, is provided with a spherical bearing face 19 whose center is located on the joint articulation center 0 around which the inner part 7 can be articulated relative to the outer part 1.

The inner running grooves 12 of which several are arranged on the circumference of the inner part 7, on their first portions 16, are stamped to their end dimensions and have a correspondingly smooth surface. No such further machining is required for the second portions 17. The first portion 16 of each inner running groove 12 serves as track for a ball 26. Furthermore, in the region of the bearing face 19, there is provided a lubricating groove 20 which extends through the webs formed between two circumferentially adjoining inner running grooves 12. The lubricating groove 20 substantially extends in the form of annular groove around the longitudinal inner part axis 8, but is interrupted by the inner running grooves 12. The resulting portions of the lubricating groove 20 in the webs are laterally open towards the adjoining inner running grooves 12. However, depending on the load conditions, it is also possible to provide a plurality of such lubricating grooves.

The bearing face 19 serves to support a cage 22 which, by means of a hollow spherical partial face 23 in its cavity, slidingly rests on the bearing face 19. In accordance with the inner running grooves 12 and the outer running grooves 5, the cage 22 is provided with circumferentially distributed windows 25, with each window 15 accommodating a ball 26. The circumferentially arranged balls 26 guide the inner part 7 relative to the outer part 1 in the radial direction and permit the inner part 7 to be articulated relative to the outer part 1. In addition, as a result of the shape of the inner running grooves 12 and of the outer running grooves 5, the ball 26 hold the cage 22 via its hollow spherical partial face 23 in contact with the spherical bearing face 1 and via its outer face 24, at a distance from the inner face 4 of the outer part 1. Furthermore, the unit consisting of the cage 22, the balls 26 and the inner part is centered relative to the outer part 1 by a control element 30 and a supporting element 27. The supporting element 27 is secured by means of a flange portion 28 to the flange 26 of the outer part 1 and comprising a supporting face 29 which is designed as a hollow spherical partial face whose center is located on the joint articulation center 0. The control element 30 comprises a spherical holding face 31 whose center is also centered on the articulation center 0, and also a contact face 32 by means of which it is displacably supported on the end face 14 arranged towards the end 13. Furthermore, a cap 33 is arranged in the region of the second end 15. The cap 33 is provided with a first cap portion 34 by means of which it at least partially extends over the outer face 24 of the cage 22. The cap 33 also comprises a second cap portion 35 which forms a cylindrical wall arranged at a radial distance from the boundary of the recess 21, so that a lubricant reservoir is formed between the cap 33, the inner part 7 and the cage 22, with the second portions 17 of the inner running grooves 12 also being used and serving to guide the lubricant in the region extending towards the hollow spherical partial face 23 of the cage 22. In the process, the lubricant reaches the lubricating groove 20 whose portions contained in the webs are open towards the second portions 17 and towards the hollow spherical partial face 23. To favor dynamic lubricating conditions, the lubricating groove 20 can be provided with radius transitions, so that between the bearing face 19 and the hollow spherical partial face 23, there is formed a wedge into which the lubricant can enter.

Although a preferred embodiment has been disclosed, a worker of ordinary skill in this art would recognize that modifications would come within the scope of this invention. For that reason the following claims should be studied to determine the true scope and content of this invention.

What is claimed is:

1. A constant velocity joint comprising:
   an outer joint part with a cavity having an inner face provided with outer running grooves arranged in meridian planes relative to a longitudinal outer part axis;
   an inner part arranged in said cavity of said outer part and which at an outer face, has inner running grooves which, in accordance with said outer running grooves are circumferentially distributed in meridian planes around a longitudinal inner part axis, with one portion of said outer face being provided in the form of a spherical bearing face;
   a hollow cage with a hollow spherical partial face for being slidingly supported on said spherical bearing face of said inner part and which has radially open windows;
   a plurality of balls with one of said balls received in each said window of said cage and projecting outwardly into an outer running groove and inwardly into an inner running groove; and
   said inner running grooves start from a first end of said inner part, extend along the entire length of said inner part as far as a second end and are open towards said second end and towards a central recess which starts from said second end and wherein said inner running grooves starting from said first end, serve only along a first portion as running grooves for an associated ball.

2. A constant velocity joint according to claim 1, wherein said inner running grooves include a second portion extending towards said second end having at least one of a modified cross-section relative to said first portion and a surface condition deviating therefrom.

3. A constant velocity joint according to claim 2, wherein between said first and second portions there is provided a groove.

4. A constant velocity joint according to claim 1, wherein said inner part is provided with a through-bore with teeth, said through-bore centered on said longitudinal inner part axis, and that said recess has a greater diameter than said through-bore.

5. A constant velocity joint according to claim 1, wherein in a bearing face of said inner part there is at least one lubricating groove arranged in the form of an annular portion around said longitudinal inner part axis in the outer face of webs remaining between two adjoining inner running grooves and which is laterally open towards adjoining inner running grooves and open towards a hollow spherical partial face of said cage.

6. A constant velocity joint according to claim 1, wherein there is provided a cap arranged in the region of said second end, which partially extends over said cage on the outside of same, and comprises a wall which is positioned inside said recess and which is arranged at a distance from a radially outer boundary of said recess.

* * * * *